United States Patent
Hwang et al.

(10) Patent No.: US 6,426,573 B1
(45) Date of Patent: Jul. 30, 2002

(54) HEAD MODULE HAVING LINEAR MOTOR

(75) Inventors: Ji Hyun Hwang; Do Hyun Kim; Hyun Joo Hwan, all of Kyungki-do; Jang Sung Chun, Seoul; Noh Won Kang; Hyun Kyo Jung, both of Kyungki-do, all of (KR)

(73) Assignee: Mirae Corporation, Choongchungnam-do (KR)

( * ) Notice: Subject to any disclaimer, the term of this patent is extended or adjusted under 35 U.S.C. 154(b) by 6 days.

(21) Appl. No.: 09/628,938

(22) Filed: Jul. 28, 2000

(30) Foreign Application Priority Data

Aug. 13, 1999 (KR) .............................. 99-33445

(51) Int. Cl.[7] ..................... G05B 19/418; H02K 41/00
(52) U.S. Cl. ......................................... 310/12; 700/247
(58) Field of Search ................... 310/12, 112; 700/245, 700/248, 253, 254, 256, 258, 260, 262

(56) References Cited

U.S. PATENT DOCUMENTS

| | | | | |
|---|---|---|---|---|
| 3,730,090 A | * | 5/1973 | Lamberg et al. | 101/365 |
| 4,426,907 A | * | 1/1984 | Scholz | 84/454 |
| 4,508,410 A | * | 4/1985 | Canham | 339/99 R |
| 4,927,380 A | * | 5/1990 | Reynolds | 439/411 |
| 5,515,731 A | * | 5/1996 | Weisshaar et al. | 73/659 |
| 5,889,834 A | * | 3/1999 | Vilsmeier et al. | 378/147 |
| 5,899,373 A | * | 5/1999 | Kamei | 226/110 |
| 5,960,821 A | * | 10/1999 | Johnson | 137/460 |
| 6,252,705 B1 | * | 6/2001 | Lo et al. | 359/393 |

FOREIGN PATENT DOCUMENTS

JP          405041596 A   *   2/1993

\* cited by examiner

Primary Examiner—Nestor Ramirez
Assistant Examiner—Judson H. Jones
(74) Attorney, Agent, or Firm—Rosenberg, Klein & Lee

(57) ABSTRACT

The present invention relates to a head module for a surface mounting apparatus, the module having a plurality of linear motors applied thereto and arranged to be interlaced with each other, thereby providing smaller head module in size and higher thrust, as well as fast and precisely controlled movement of the heads. There is provided the head module for use in the surface mounting apparatus and having a plurality of heads, the head module including a plurality of hollow shafts for holding surface-mounted parts, and a plurality of linear motors having the plurality of hollow shafts mounted therein and for vertically moving the shafts, respectively, wherein the linear motors are arranged to be interlaced with each other.

1 Claim, 3 Drawing Sheets

CONVENTIONAL ART

HEAD MODULE HAVING LINEAR MOTOR

BACKGROUND OF THE INVENTION

1. Field of the Invention

The present invention relates to a head module incorporating linear motors, and more particularly to a head module having a plurality of linear motors applied to the head module and arranged to be interlaced with each other, thereby providing smaller head module in size and higher thrust, as well as fast and precisely controlled movement of the heads.

2. Description of the Conventional Art

With the advancement of technologies for fabricating semiconductor devices, the mass production of highly integrated semiconductor devices becomes made possible. There has been provided a surface mounting apparatus for meeting the need to fast and precisely mount such semiconductor devices into the printed circuit board (PCB).

The surface mounting apparatus comprises a feeder for supplying electronic components, a head for receiving the electronic component supplied from the feeder, a transferring means for moving the head carrying the electronic component and mounting the electronic component onto the PCB, and a carrier means for transferring the PCB. The surface mounting apparatus thus structured will be described below, with reference to the drawings.

FIG. 1 shows a front view of a conventional surface mounting apparatus. As shown in FIG. 1, the apparatus comprises a base cabinet 50, a pair of Y frames 52 arranged on the base frame 50, and an X frame 54 bridging the two Y frames 52. A head module 10 is located at a predetermined position of the X frame 54. The pick and place operation of the head module 10 seats the electronic component 58 supplied from a tape feeder 60 onto the PCB 56. A vision device 62 is used to properly position the electronic component at its origin location, and then the head module 10 mounts the electronic component onto the PCB 56.

FIG. 2 shows a front view of the conventional head module shown in FIG. 1. As shown in FIG. 2, the head module 10 comprises a plurality of heads 11, 12, 13, 14 each of which employs each linear motor. The heads 11, 12, 13, 14 have the linear motors 11a, 12a, 13a and 14a, air valves 11b, 12b, 13b, 14b and hollow shafts 11c, 12c, 13c, 14c, respectively.

To pick and hold the electronic component, the heads 11, 12, 13, 14 vertically moves the hollow shafts 11c, 12c, 13c, 14c until leading ends of the hollow shafts 11c, 12c, 13c, 14c arrive at positions where the electronic components to be mounted are present. After the movements of the heads, air is controllably taken in through the air valves 11b, 12b, 13b, 14b, and then supplied into the hollow shafts 11c, 12c, 13c, 14c, so that the electronic components can be picked or seated at the predefined locations.

The heads of the head module 10 as described above are arranged to be separated at a constant distance 'm', as shown in FIG. 2. The constantly maintained distance between the heads limits the dimension of the linear motors 11a, 12b, 13a, 14a, thus results in the provision of limited thrust from the motors.

SUMMARY OF THE INVENTION

Therefore, it is an object of the present invention to provide a head module in which a plurality of linear motors, applied to the head module for the surface mounting apparatus, are arranged to be interlaced with each other, and thus provides smaller head module in size and higher thrust, as well as fast and precisely controlled movement of the heads.

According to the present invention, there is provided a head module for use in a surface mounting apparatus and having a plurality of heads, the head module comprising: a plurality of heads each employing a linear motor as a driving source for vertically moving each of hollow shaft; the plurality of hollow shafts for holding surface-mounted parts; and a plurality of linear motors having the plurality of hollow shafts mounted therein and for vertically moving the shafts, respectively, wherein the linear motors are arranged to be interlaced with each other.

According to the present invention, there is provided a head module in which a plurality of linear motors, applied to the head module for the surface mounting apparatus, are arranged to be interlaced with each other, and thus provides smaller head module in size and higher thrust, as well as fast and precisely controlled movement of the head.

DETAILED DESCRIPTION OF THE INVENTION

The preferable embodiment of a head module to which a linear motor is applied in accordance with the present invention will be described, with reference to the accompanying drawings.

Figure 1:
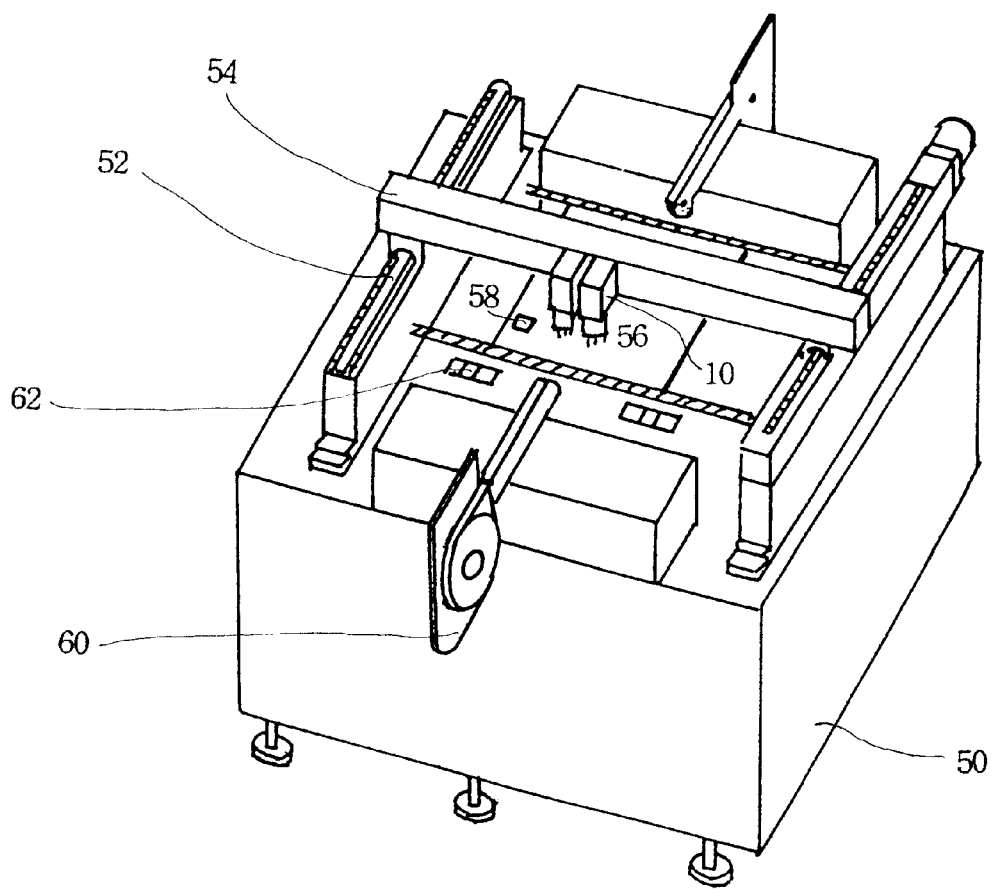
FIG. 1 shows a front view of a conventional surface mounting apparatus.
Figure 2:
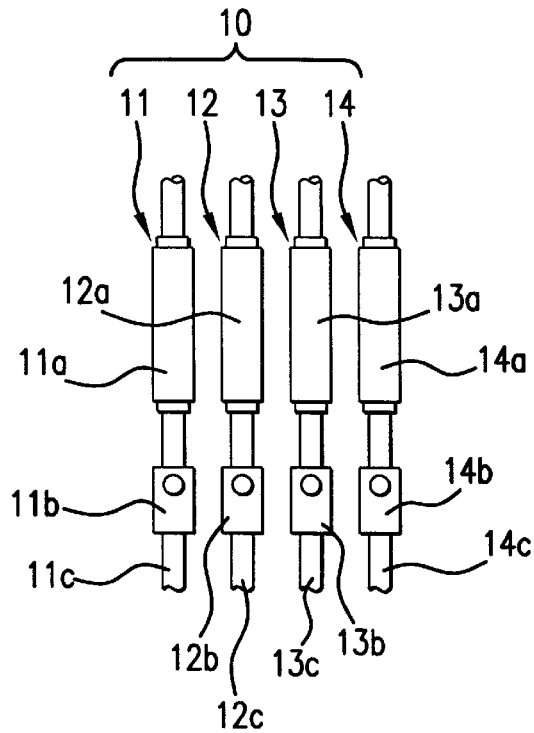
FIG. 2 shows a front view of the conventional head module shown in FIG. 1.
Figure 3:
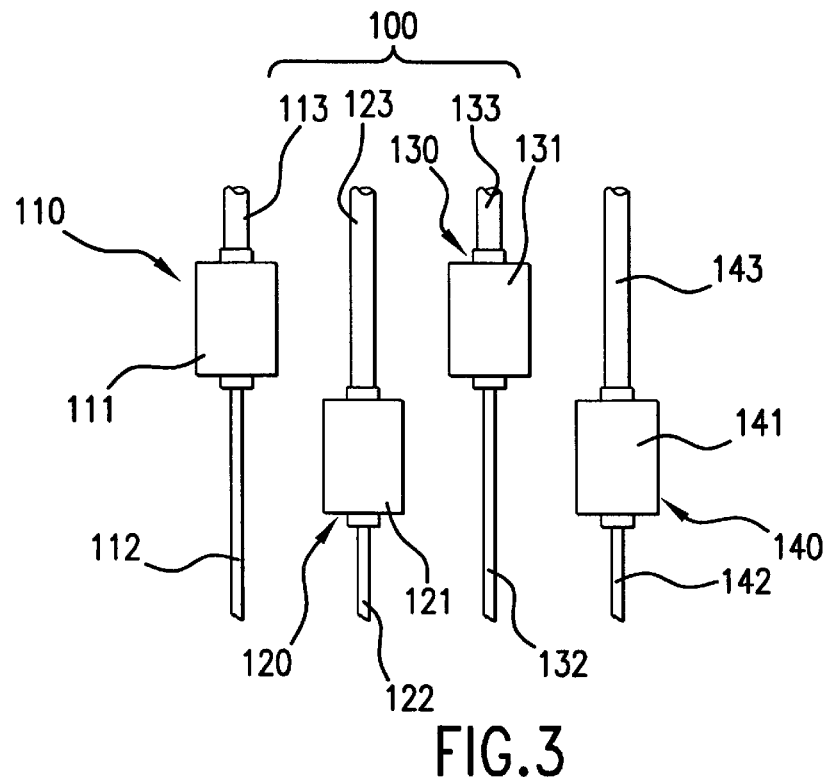
FIG. 3 is a front view of a head module according to the present invention.
Figure 4:
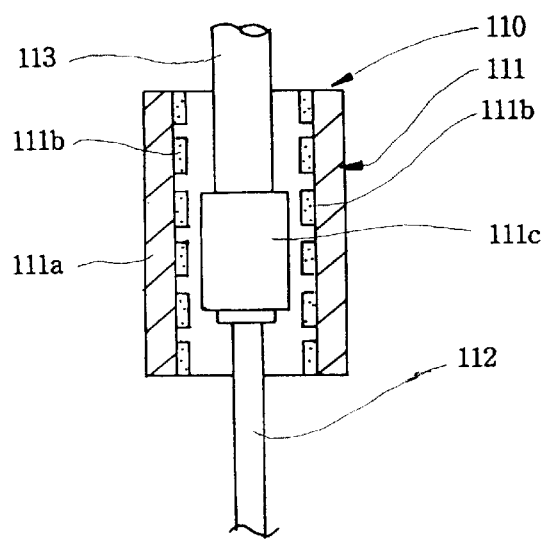
FIG. 4 is a side sectional view of the head in FIG. 1.
Figure 5:
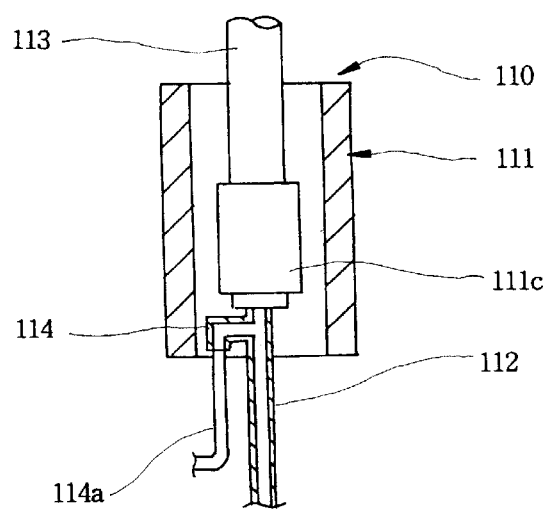
FIG. 5 is a cross sectional view of the head in FIG. 3.

FIG. 3 is a front view of a head module according to the present invention, FIG. 4 is a side sectional view of the head in FIG. 1, and FIG. 5 is a cross sectional view of the head in FIG. 3.

As shown in FIGS. 3 to 5, there are shown a plurality of heads 110, 120, 130, 140, each employing each of linear motors 111, 121, 131, 141 used as driving sources for vertically moving hollow shafts 112, 122, 132, 141, wherein the linear motors 111, 121, 131, 141 applied to the plural heads 110, 120, 130, 140 are arranged to be interlaced with each other.

The head module 100 applied to the present invention consists of first to fourth heads 110, 120, 130, 140, the heads commonly having the linear motor 111, 121, 13, 141, the hollow shafts 112, 122, 132, 141 and the shafts 113, 123, 133, 143, respectively. For the heads 110, 120, 130, 140 having the same structure, the linear motors 111, 121, 131, 141 are arranged to be interlaced with each other such that such an arrangement constitutes the head module 100, as shown in FIG. 3.

The interlaced arrangement of the linear motors 111, 121, 131, 141 allows relatively larger motors 111, 122, 131, 141 to be used in the head module 100, and thus results in the provision of higher thrust from the linear motors in a limited space of the surface mounting apparatus.

The internal structure of each of motors 111, 121, 131, 141, which are applied to the respective heads 110, 120, 130, 140, will be described. For the sake of brevity, only one linear motor 111 of the first head 10 will be described below. Referring to FIG. 4, the linear motor 111 for the first head 110 consists of a primary stator element 111a having side wall on which permanent magnets 111b are disposed, and a secondary movable element 111c which is placed opposing to the permanent magnets 111b.

To the secondary movable element 111c is coupled a shaft 113, one end of which is coupled to a hollow shaft 112 having an air valve 114 provided thereat, as shown in FIG. 5. The air valve is provided to controllably take in air in order to hold or release an electronic component by means of the hollow shaft 112.

The linear motor 111 is activated such that the first head 110 is moved to a position where electronic components (not shown) are placed. A thrust is generated between the permanent magnet 111b mounted onto the primary stator element 111a and the movable element 111c when electric current is applied to the secondary movable element 111c of the linear motor 111. The thrust causes the movable element 111c to move.

The movement of the movable element 111c causes the movement of the shaft 113 coupled to the movable element 11c, whereby the hollow shaft 112 coupled to the shaft 113 is moved downward to reach the position from which the electronic components are available.

At the time when one end of the hollow shaft 112 reaches the position where the electronic components are present, the air valve 113 in the linear motor 111 starts to take air, which then provides a suction force permitting the holding of electronic component which will be transferred to a predetermined place.

The air taken by the air valve 114 is expelled outside from an air pipe 114a, and the air valve 114 is controlled to lower the suction force in such a manner that the electronic component arrived at the predetermined position can be seated at the predefined place. The pick and placement of the electronic component is achieved by using a solenoid valve that may be implemented as the air valve 114 for automatically taking in air.

The structure and operation of the first head 110 may be similarly applied to the remaining second to fourth heads 120, 130, 140. Also, the interlaced arrangement of the linear motors 111, 121, 131, 141 makes it possible to obtain higher trust.

With the higher thrust being provided by the respective linear motors 111, 121, 131, 141, it becomes possible to conduct fast and precise control in the vertical movement of the head 110. Further, the internal installation of the air valve 114 in the linear motor 111 permits the smaller head module 110.

The plurality of linear motors, applied to the head module for the surface mounting apparatus, are arranged to be interlaced with each other, and thus provides smaller head module in size and higher thrust, as well as fast and precisely controlled movement of the heads.

What is claimed is:

1. A head module for use in a surface mounting apparatus having a plurality of heads, the head module comprising:

a plurality of hollow shafts for holding surface-mounted parts; and a plurality of linear motors respectively drivingly coupled to the plurality of hollow shafts mounted therein for vertically moving the shafts, wherein the linear motors are interlaced with some other such that some of the plurality of linear motors are disposed adjacent a corresponding one of said plurality of hollow shafts of an adjacent linear motor.

* * * * *